(No Model.)

J. T. GRAY.
STEP FOR VEHICLES.

No. 340,111. Patented Apr. 20, 1886.

Witnesses
M. E. Fowler
J. W. Garner

Inventor
J. T. Gray
By his Attorneys

UNITED STATES PATENT OFFICE.

JOHN THOMAS GRAY, OF DEEP WATER, MISSOURI.

STEP FOR VEHICLES.

SPECIFICATION forming part of Letters Patent No. 340,111, dated April 20, 1886.

Application filed January 29, 1886. Serial No. 190,200. (No model.)

*To all whom it may concern:*

Be it known that I, JOHN THOMAS GRAY, a citizen of the United States, residing at Deep Water, in the county of Henry and State of Missouri, have invented a new and useful Improvement in Steps for Vehicles, of which the following is a specification, reference being had to the accompanying drawings.

My invention relates to an improvement in steps for vehicles; and it consists in the peculiar construction and combination of devices that will be more fully set forth hereinafter, and particularly pointed out in the claims.

Figure 1:
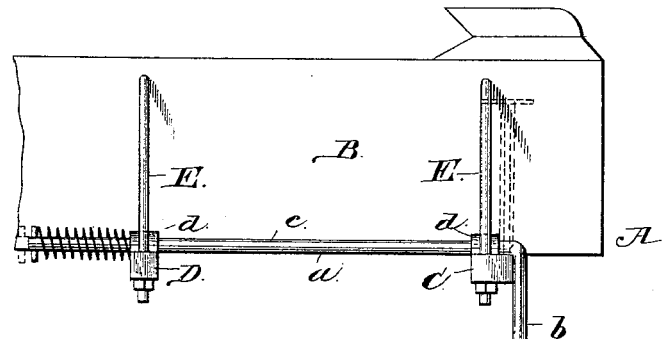
Figure 2:
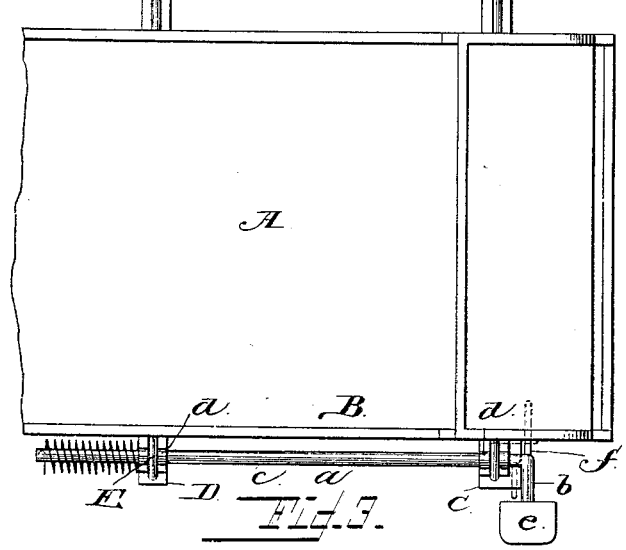
Figure 3:
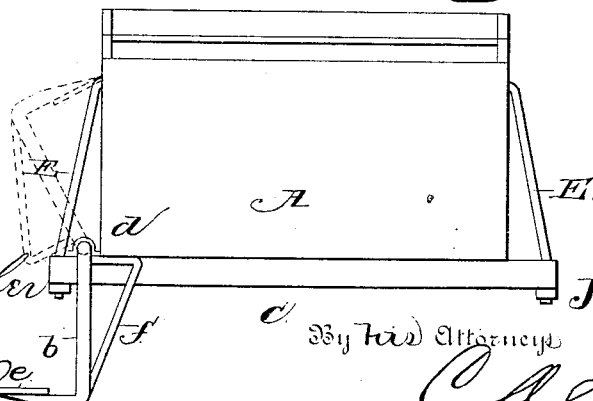

In the drawings, Figure 1 is a side elevation of a portion of a wagon-bed with my improved step attached thereto. Fig. 2 is a top plan view of the same. Fig. 3 is a front elevation of the same.

A represents a wagon-bed of the usual construction, of which B is one of the sides, and C D are the usual cross-bars, which extend transversely under the bottom of the bed and have their ends projecting beyond the sides thereof.

E represents the usual iron brace-rods that connect the ends of the cross-bars with the sides of the wagon-bed.

*a* represents an iron rod or bar, one end of which is bent at right angles, thus forming a short arm, *b*, and a long arm, *c*. The long arm exceeds in length the space between the bars C and D, and is journaled in bearings *d* on the ends of the cross-bars, and is free to move endwise for a suitable distance therein. To the short arm, which is toward the front end of the wagon-bed, is attached a step, *e*. On one end of the long arm is a coiled extensile bearing-spring, which presses the rod *b* rearwardly when the said rod is turned in its bearings to swing the step up against the side of the wagon-bed, as shown in dotted lines in Figs. 1 and 3.

To one side of the short or step arm is attached an angle-brace, *f*, which, when the step is turned down to the position shown in solid lines in the drawings, bears under the bottom of the wagon-bed, and prevents the step from swinging under the wagon-bed when a person steps upon it, either in getting into or out of the wagon.

When the step is turned up out of the way, the spring moves the bar *b* rearwardly a slight distance, and causes the brace *f* to bear upon the top of the cross-bar C to support the step in the raised position. The tension of the spring on the rod *b* prevents it from rattling when the wagon is in motion.

A step thus constructed is simple, cheap, and durable, can be attached to any wagon or vehicle, will not rattle, can be moved easily out of the way, and is very convenient and useful.

Having thus described my invention, I claim—

1. In a vehicle-step, the endwise moving rocking bar *b*, attached to the vehicle and carrying the step, and the spring for locking the bar and step in position when the latter is upturned, substantially as described.

2. The bent bar journaled to the vehicle and carrying the step, and having the brace or arm *f* to bear under the body or bed of the wagon or other support to prevent the step from swinging under the same, substantially as described.

In testimony that I claim the foregoing as my own I have hereto affixed my signature in presence of two witnesses.

JOHN THOMAS GRAY.

Witnesses:
CHAS. M. SWEENEY,
J. S. BOARMAN.